(12) United States Patent
Nabahi

(10) Patent No.: US 6,266,811 B1
(45) Date of Patent: Jul. 24, 2001

(54) METHOD AND SYSTEM FOR CUSTOM COMPUTER SOFTWARE INSTALLATION USING RULE-BASED INSTALLATION ENGINE AND SIMPLIFIED SCRIPT COMPUTER PROGRAM

(75) Inventor: Narimane Nabahi, Santa Clara, CA (US)

(73) Assignee: Network Associates, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/418,426

(22) Filed: Oct. 14, 1999

Related U.S. Application Data

(63) Continuation of application No. 09/001,612, filed on Dec. 31, 1997, now Pat. No. 6,006,035.

(51) Int. Cl.[7] .................................................. G06F 9/45
(52) U.S. Cl. ...................................................... 717/11
(58) Field of Search .................. 717/11, 2; 709/203; 714/25; 345/348; 700/49

(56) References Cited

U.S. PATENT DOCUMENTS

| | | | |
|---|---|---|---|
| 5,159,587 | * 10/1992 | Richburg | 717/2 |
| 5,367,698 | * 11/1994 | Webber et al. | 709/203 |
| 5,428,525 | * 6/1995 | Cappelaere et al. | 700/49 |
| 5,596,695 | * 1/1997 | Hamada et al. | 345/333 |
| 5,727,174 | * 3/1998 | Apaicio, IV et al. | 345/348 |
| 5,983,364 | * 11/1999 | Bortcosh et al. | 714/25 |
| 6,006,035 | * 12/1999 | Nabahi | 717/11 |

* cited by examiner

Primary Examiner—Kakali Chaki
Assistant Examiner—Hoang-Vu Antony Nguyen-Ba
(74) Attorney, Agent, or Firm—Pennie & Edmonds LLP

(57) ABSTRACT

A method and system for custom computer software installation using a standard rule-based installation engine is disclosed. Custom installation parameters are translated into a simplified script language file by a system administrator. An application software package is installed onto a computer using the standard rule-based installation engine, which is executed normally according to commands stored in a rule-based instruction file. The rule-based instruction file has been configured by the provider of the application software package to cause the rule-based installation engine to execute commands according to the simplified script language file. In this manner, the system administrator may achieve flexibility and control over each phase of the software installation process without being required to have a knowledge of the specific language of the rule-based instruction file.

14 Claims, 4 Drawing Sheets

METHOD AND SYSTEM FOR CUSTOM COMPUTER SOFTWARE INSTALLATION USING RULE-BASED INSTALLATION ENGINE AND SIMPLIFIED SCRIPT COMPUTER PROGRAM

This is a continuation, of application Ser. No. 09/001,612, filed Dec. 31, 1997 now U.S. Pat. No. 6,006,035.

FIELD OF THE INVENTION

The present invention relates generally to computer systems and computer networks. In particular, the present invention relates to a method and system for installing application software packages onto one or more computers.

BACKGROUND OF THE INVENTION

As new and useful application software packages for personal computers are developed, the need arises for an automated or semi-automated process for installing a given application software package onto a plurality of computers. This need arises, for example, in the context of corporate computer networks which may comprise tens, hundreds, or even thousands of client computers. For such corporate computer networks, the purchase and installation of even a single new application software package can become a major task, requiring a large amount of time and effort from the system administrators whose job it is to support the many client computers coupled to a corporate computer network.

FIG. 1 shows a typical corporate computer network 100 comprising a network backbone 102, a plurality of local area network servers 104a–c, and a plurality of client computers 106a–l. Corporate computer network 100 further comprises a gateway computer 108 for coupling the corporate computer network 100 to an external network such as the Internet. Corporate computer network 100 further comprises a service computer 112 which, generally speaking, is a computer dedicated at least in part to assisting in servicing the various hardware and software applications being used by corporate computer network 100. Finally, shown in FIG. 1 is a system administrator 114. Generally speaking, the system administrator 114 represents the person or persons responsible for supporting the users of the client computers 106a–l and for servicing the various hardware and software applications being used by corporate computer network 100.

FIG. 2 shows steps taken in the development, distribution, and installation of application software packages according to the prior art. At step 202, an application software package represented by the files NEW_APP.EXE and NEW_DATA.DAT are developed by an application software manufacturer. At step 204, the application software manufacturer develops a rule-based instruction file SETUP.INS. At step 206, the application software manufacturer releases the application software package by either a physical data delivery mechanism such as a CD-ROM, a magnetic media disk, or a DVD-disk, or alternatively configures the application software package for electronic delivery, e.g., by posting the application software package on an Internet World Wide Web Site or bulletin board. Along with the application software package files NEW_APP.EXE and NEW_DATA.DAT, the rule-based instruction file SETUP.INS is included, along with a rule-based installation engine denoted by a file SETUP.EXE.

A rule-based installation engine is a standard computer program which is designed to install an application software package from a first medium onto a client computer when executed. Examples of rule-based installation engines include InstallShield®, Wise Installation System, and Microsoft Setup Toolkit. A rule-based installation engine is characterized in that it provides a standard installation environment, e.g. standard configuration options, familiar look-and-feel, etc., while operating according to a set of rules that are expressed in a rule-based instruction file. As an example, InstallShield® is commonly used for installing many Windows 95™-based application software packages. Installshield® is provided with a variety of software packages ranging from antivirus application software such as McAfee VirusScan™ to natural speech detection programs such as Dragon Systems NaturallySpeaking™. When a user invokes Installshield® by launching its executable file named SETUP.EXE, a selection from among a standard set of dialog and options boxes appear to the user, according to parameters in a rule-based instruction file SETUP.INS generated by the application software manufacturer. Such familiar dialog and options boxes include, for example, a license dialog box for displaying a license agreement to the user, and a destination files dialog box for requesting a destination directory for installed application software files.

A rule-based instruction file is a computer file that is readable by a rule-based installation engine and that comprises a set of instructions and parameters for use during the instruction process. As an example, the InstallShield® program operates according to a rule-based installation file called SETUP.INS and generally according to files having an INS extension. When the exemplary InstallShield® system is used as a delivery vehicle by an application software manufacturer, at step 204 the application software manufacturer generates a rule-based instruction file named SETUP.INS. This file provides a set of detailed instructions from the application software manufacturer including specific parameters associated with the application software package and computer operating system. This file also includes defaults, including the location of a desired license agreement file, the default destination directory, the identity of the application software files that require duplication onto the destination client computer, and default parameters for entry into the client computer operating system.

Importantly, at step 204 the application software manufacturer generates the rule-based instruction file named SETUP.INS by first writing a rule-based installation language file which may bear, for example, the name SET_UTIL.RUL. This file is created according to a specific set of commands adapted for the specific rule-based installation engine. For the exemplary InstallShield engine, descriptions of the specific language used in the rule-based installation language files *.RUL may be found in documents including "InstallShield 3 User's Guide," InstallShield Corporation, rev. 4/29/96, which is hereby incorporated by reference into the present disclosure. A proprietary compiler ICOMP.EXE provided to the application software manufacturer by InstallShield is used to compile the rule-based installation language files *.RUL into rule-based instruction files *.INS. Accordingly, the *.INS files are binary files which cannot be read or modified using a standard ASCII editor. The compilation requirement of the rule-based installation engine providers helps to ensure that rule-based installation language files are accurately written by the application software manufacturer prior to release. This is due to the fact that many mistakes in writing the rule-based installation language file would be detected by the compiler, thus preventing the release or erroneous or buggy installation routines. Additionally, speed of execution is increased over a situation where an ASCII or non-compiled rule-based installation language file is used. Finally, security of the product is enhanced with regard to unauthorized access to proprietary information contained therein.

At step 208 of FIG. 2, the system administrator 114 acquires the magnetic disk or other medium containing the application software and installation files. At steps 210–220, using distribution methods known in the art, system administrator 114 distributes the application software and installation files to each of the computers 106a–106l that require the new software installation. In what is perhaps the oldest prior art method, the system administrator physically goes to each computer with the CD-ROM or disk, executes the rule-based installation engine program, i.e. the InstallShield® SETUP.EXE program, and enters the appropriate responses when prompted. In particular, starting at step 210, the system administrator 114 launches the rule-based installation engine at each client computer COMPUTER (i) at step 212. At steps 214 and 216, the system administrator 114 enters the appropriate information when prompted. At steps 218 and 220, the system administrator 114 continues on to the next computer COMPUTER (i+1), or else the process ends if installation has occurred on all required client computers. In another prior art method similar to that depicted in FIG. 2, the files identified at step 206 are distributed electronically to the client computers 106a–106l, wherein each user individually runs the rule-based installation program.

The above prior art method is disadvantageous in that there are no accommodations for custom parameters that may be desired by the system administrator 114 during the installation process. Rather, the installation will simply contain the default instructions and parameters in SETUP.INS provided with the application software. It would be desirable in many circumstances for custom installation to take place. For example, a custom licensing agreement display may be desired, custom destination directories may be desired, or it may be required that specialized files overwrite the standard application software files during the installation process.

The lack of custom installation parameters and commands during execution of the rule-based installation engine SETUP.EXE is not practically resolvable through modification of SETUP.INS by the system administrator 114. As indicated previously, the SETUP.INS file is very difficult to read or modify in that it is a binary file created by a special compiler that is not provided to the system administrator with the application software package. Further, the rule-based installation language files *.RUL are also generally not provided to the system administrator. Most importantly, however, even if these elements were provided to the system administrator, it would be very difficult for the system administrator to modify the rule-based instruction file directly, as it is written in a highly detailed and specific form. Generally speaking, rule-based instruction files contain code that is unique to each provider of rule-based installation engines, code that is not easily created or even deciphered by the system administrator 114. A major portion of the rule-based instruction file, which may exceed 400 KB for many products, is devoted to intricacies of the application software and installation process that-is not of concern to the system administrator, and proper entry and exit points would be difficult to discern unless the system administrator were to take the time to become skilled in that language. See generally "InstallShield 3 User's Guide" as referenced above.

While rule-based instruction files are generally very difficult to create from scratch, a limited set of tools are sometimes available to the system administrator to allow generation of custom rule-based instruction files. As an example, using a feature of the InstallShield® program, the system administrator can "record" a limited set of default installation parameters into a *.SIS file by executing the SETUP command line with the command "SETUP -R". The recorded *.SIS file can then be invoked on subsequent installations using the command "SETUP -S". However, this prior art method only allows a limited set of options to be adjusted, e.g. the default destination directory, and does not allow for custom operating system commands to be executed at custom times during the installation process. The Installshield® recording process is described on a publicly available CD-ROM disk entitled VirusScan™ version 3.0.0 (3000) in the file \Win95\WHATSNEW.TXT, which is hereby incorporated by reference into the present disclosure. Generally speaking, the prior art as outlined above allows only a fixed-format, serially presented, and limited set of installation parameters to be specified by a system administrator for execution along with the provided rule-based instruction language file commands.

It has been found that flexible and customizable installation procedures are especially important when antivirus application software packages are being installed on a plurality of client computers such as those in the corporate computer network 100. Generally, a computer virus is a program that is capable of attaching to other programs or sets of computer instructions, replicating itself, and performing unsolicited or malicious actions on a computer system. Generally, computer viruses are designed to spread by attaching to floppy disks or data transmissions between computer users, and are designed to do damage while remaining undetected. The damage done by computer viruses may range from mild interference with a program, such as the display of an unwanted political message in a dialog box, to the complete destruction of data on a user's hard drive. It is estimated that new viruses are created at a rate of over 100 per month. A variety of antivirus programs have been developed to detect and destroy computer viruses.

It is important to ease the installation and distribution of antivirus applications software packages and to provide a more flexible and yet simple method for installing them onto a plurality of client computers. As an example, it is important in an antivirus installation environment to display timely information to the user regarding computer viruses, information that often becomes available only after the release of the antivirus application software disk. As another example, updated *.DAT files containing newly unleashed virus signatures often need to be installed over the existing *.DAT files which accompany the antivirus application software disk. Information related to antivirus applications is included in a publicly available CD-ROM disk entitled VirusScan™ version 3.0.1. All files contained on the CD-ROM disk VirusScan™ version 3.0.1 are hereby incorporated by reference into the present disclosure.

Accordingly, it would be desirable to provide a method and system for allowing a system administrator to install an application software package onto a plurality of client computers using a flexible and customizable installation process.

It would be further desirable to provide a method and system for allowing the system administrator to use a familiar and standardized rule-based installation engine to install an application software package onto a plurality of client computers.

It would be even further desirable to allow for customization of the rule-based installation process without requiring the system administrator to have knowledge of the rule-based installation language being used.

SUMMARY OF THE INVENTION

These and other objects are achieved by a method and system for installing an application software package onto a computer using a rule-based installation engine, wherein custom installation parameters are translated into a simplified script language file by a system administrator. The application software package is installed onto a computer using the standard rule-based installation engine, which is executed normally according to commands stored in a rule-based instruction file. The rule-based instruction file is modified and configured by the provider of the application software package to cause the rule-based installation engine to execute commands according to the simplified script language file. In this manner, the system administrator may achieve flexibility and control over each phase of the software installation process without being required to have a knowledge of the specific language of the rule-based installation engine.

In a preferred embodiment, the rule-based installation engine is capable of operation according to commands stored in rule-based instruction files. The system administrator acquires the application software package, and determines at least one custom installation parameter associated with the application software package. The at least one custom installation parameter may comprise, for example, an instruction to execute a certain program during a certain phase of the installation process, or other commands. The custom installation parameter is expressed by the system administrator into a simplified and intuitive script language command and recorded in a simplified script language file. After all custom parameters are so translated, the simplified script language file is compiled into a compiled installation script file using a script compiler. The rule-based instruction file is modified and configured by the provider of the application software package to cause the rule-based installation engine to execute commands in the complied script language file. The rule-based installation engine is then executed according to the rule-based instruction file for installing the application software package.

In another preferred embodiment, the simplified script language file comprises a predetermined sequence of installation phase portions corresponding to time periods between a predetermined set of installation events. The predetermined set of installation events may include some or all of the following events: an initialization of internal settings of the rule-based installation engine; a display of a license agreement; a request for a destination directory; a copying of application software files to the destination computer; a configuration of operating system parameters to allow execution of the application software program, e.g. the configuration of INI and registry files for Windows 95™ computers; creation of application software program icons; display of a README file; and deletion of temporary installation files and exiting of the installation procedure.

In another preferred embodiment, the application software package is an antivirus software package, and one of the custom installation parameters corresponds to a command for installing a newer set of virus signature files over preexisting virus signature files that were provided with the antivirus software package. In another preferred embodiment, a second custom installation parameter corresponds to a command for displaying virus updates and warnings that are newer than virus updates and warnings provided with the antivirus software package.

DETAILED DESCRIPTION OF THE INVENTION

The structure and function of the preferred embodiments can be understood by reference to the drawings. The reader will note that the same reference designations appear in multiple locations. Where this is the case, the numerals refer to the same or corresponding structure or steps in those locations.

Figure 3:
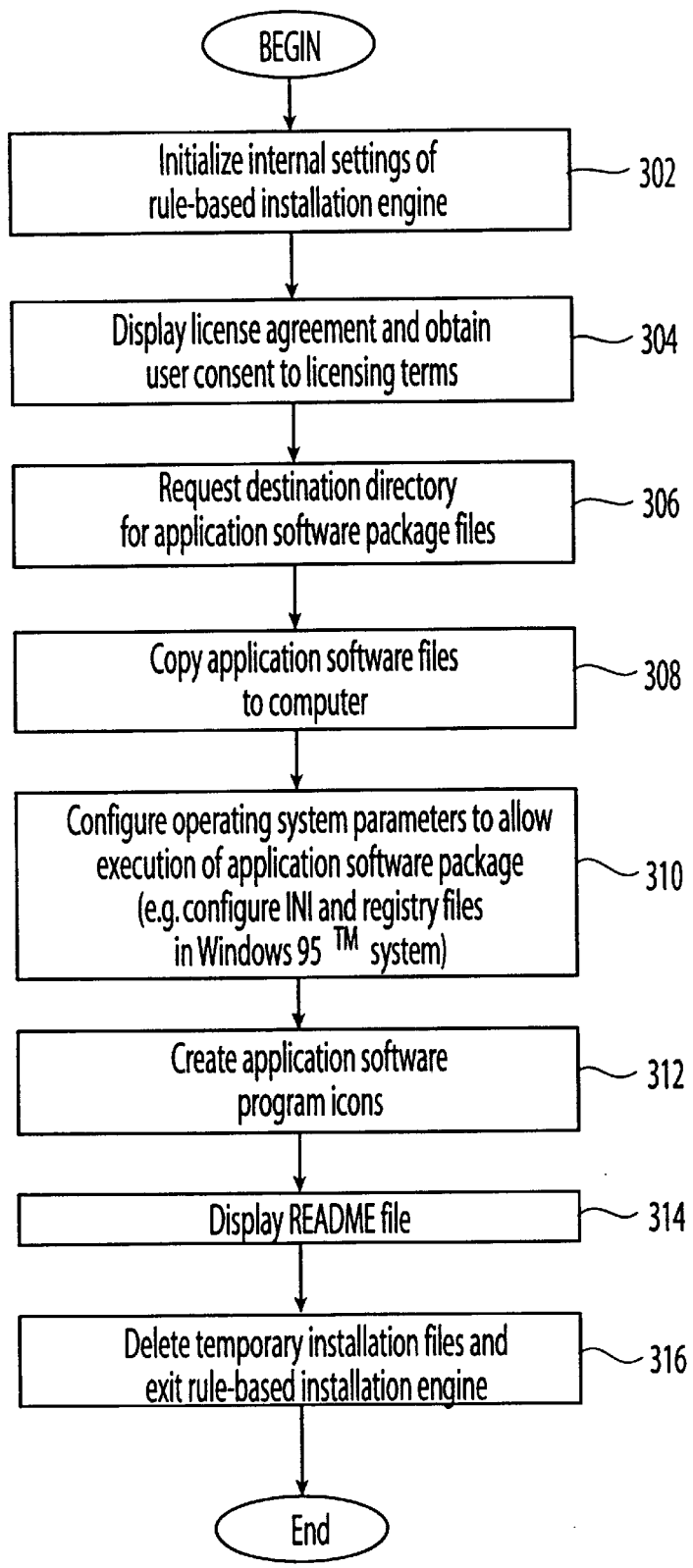
FIG. 3 shows installation events associated with the installation of an application software package onto a client computer.

FIG. 3 shows a set of installation events associated with the installation of an application software package onto a client computer using an exemplary rule-based installation engine according to a preferred embodiment. It is to be appreciated that while the embodiment shown corresponds generally to the InstallShield® program, the scope of the preferred embodiments is by no means limited to this rule-based installation engine. Rather, the scope of the preferred embodiments applies to any of a variety of rule-based installation engines including Wise Installation System, Microsoft Setup Toolkit or any other standard computer program which is designed to install an application software package from a first medium onto a client computer when executed and which is capable of operation according to rule-based instruction files. It is to be further appreciated that while a Windows 95™ operating system is used in the examples below, the scope of the preferred embodiments is by no means limited to a Windows 95™ environment.

One publicly available document that discloses an installation script language, a rule-based installation engine, and a script compiler for allowing customized installation of application software packages is "Technotes: VirusScan for Windows 95 3.0; ISeamless Install Scripting", a publicly available document that is available on request from Network Associates, Inc. (formerly McAfee Associates) at 408-988-3832.

At step 302 of FIG. 3, a first installation event is shown, during which internal settings of the rule-based installation engine are initialized. At step 304, a license agreement is displayed and user consent to licensing terms is obtained. At step 306, a request for a destination directory for application software package files is made. At step 308, application software files are copied to the client computer. At step 310, operating system parameters are altered to allow execution of the application software package. In a Windows 95 environment, for example, the settings in certain INI files and in the registry files are altered at step 310.

At step 312, application software program icons are created corresponding to the newly installed software. At step 314, a README file is displayed. Finally, at step 316, a cleanup operation occurs wherein temporary installation files and directories are deleted, and the installation procedure exits.

The above steps 302–316 are representative of a predetermined set of installation events that take place during execution of a rule-based installation engine. Several of the steps are often optional, including steps 302–306 and steps 312–314. It has been found that a predetermined set of installation phase portions may be defined according to the time intervals lying between the above discrete installation events. According to a preferred embodiment, custom installation instructions expressed as simplified script language commands may be executed during any of the predetermined set of installation phase portions. These commands include, but are not limited to: copying a file from a source directory to a destination directory; deleting a file; launching any application program for serial or parallel execution with subsequent installation steps; altering operating system parameters expressed as registry values; altering operating system parameters expressed in INI files; and altering a specific subset of rule-based installation parameters. Upon reading the present disclosure and the documents incorporated by reference, the implementation of such simplified script commands and a compiler for converting these commands into a rule-based instruction file will be readily apparent to one skilled in the art.

Figure 1:
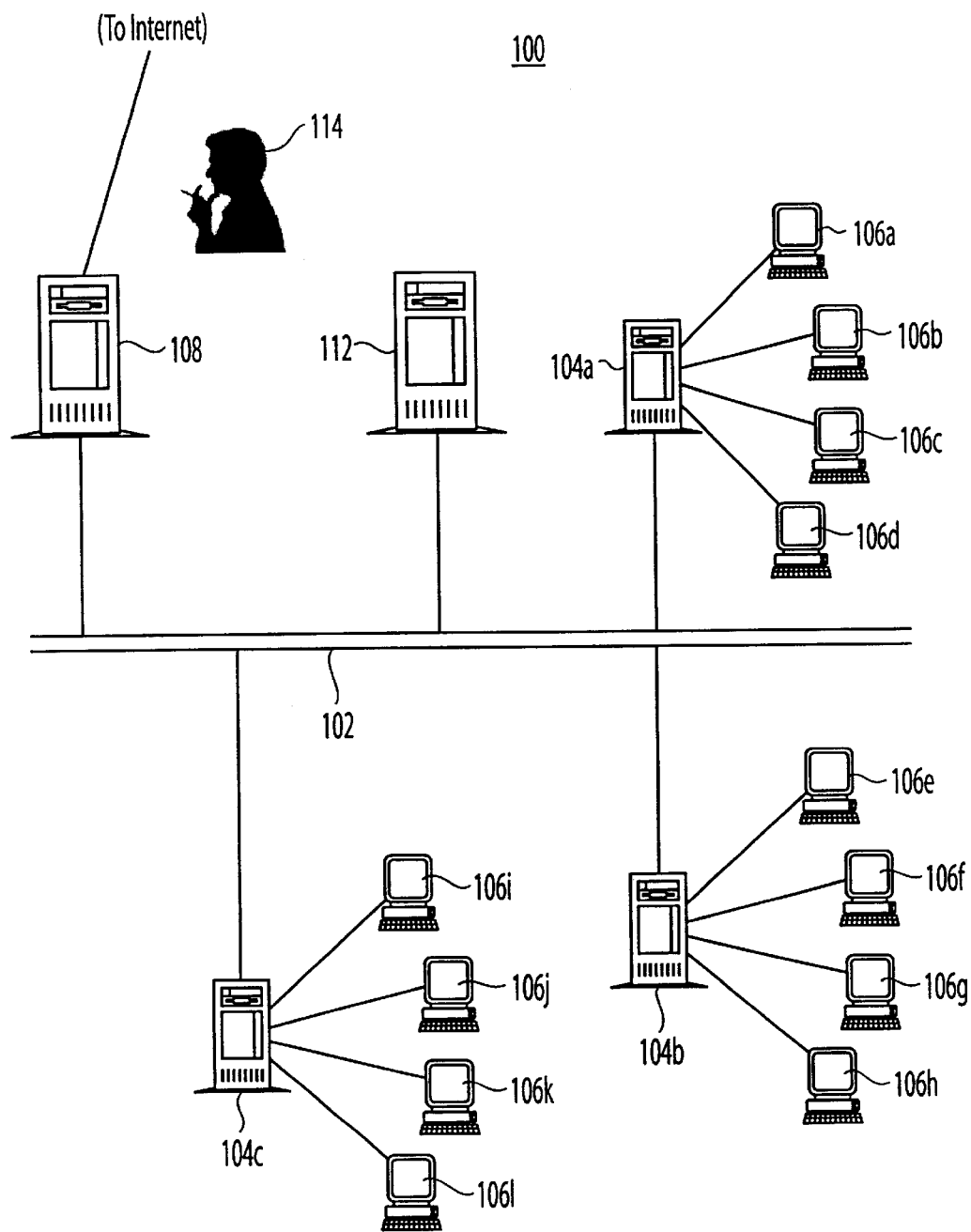
FIG. 1 shows a diagram of a computer network comprising a plurality of client computers.
Figure 2:
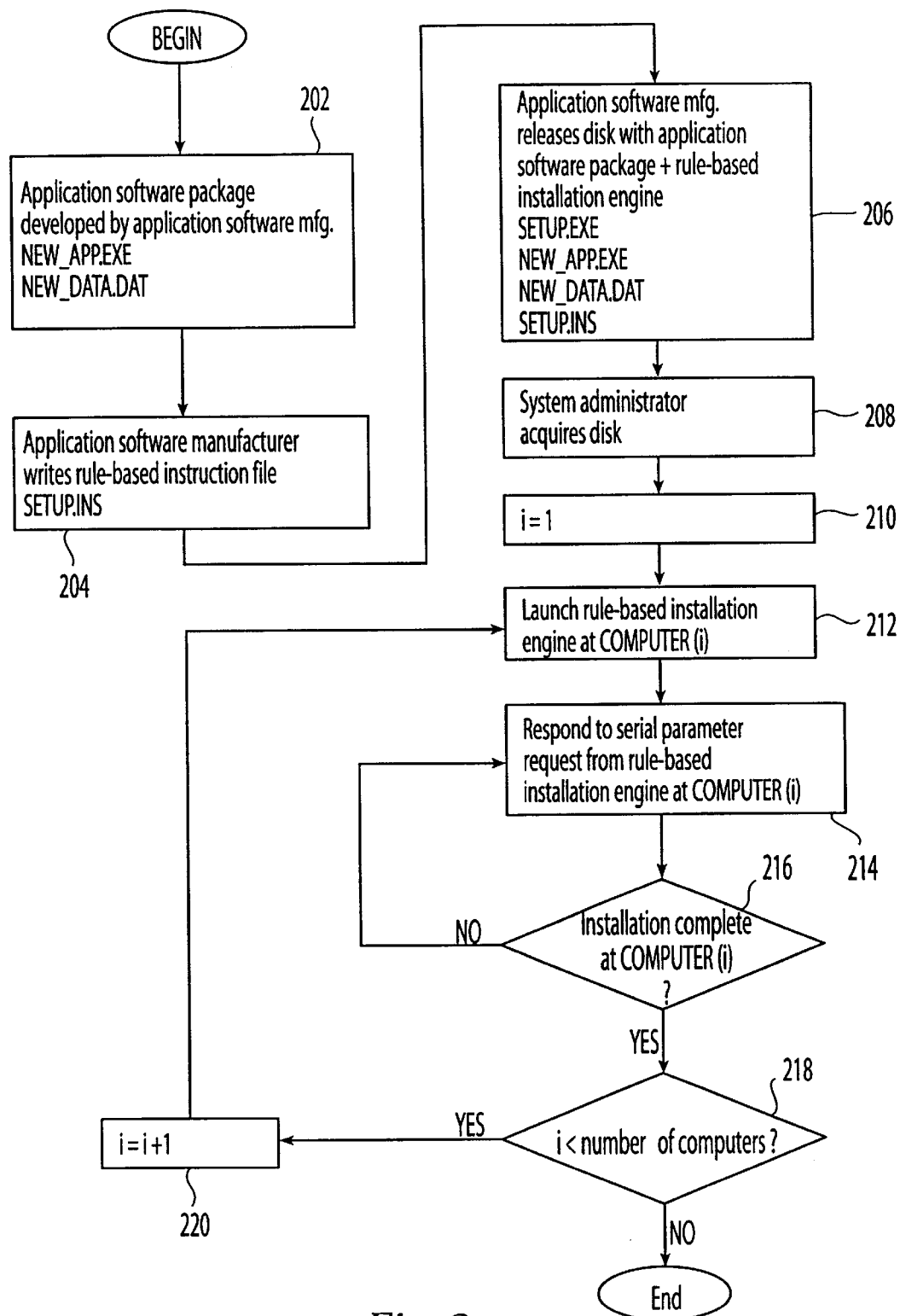
FIG. 2 shows steps taken in the development and installation of an application software package according to the prior art.
Figure 4:
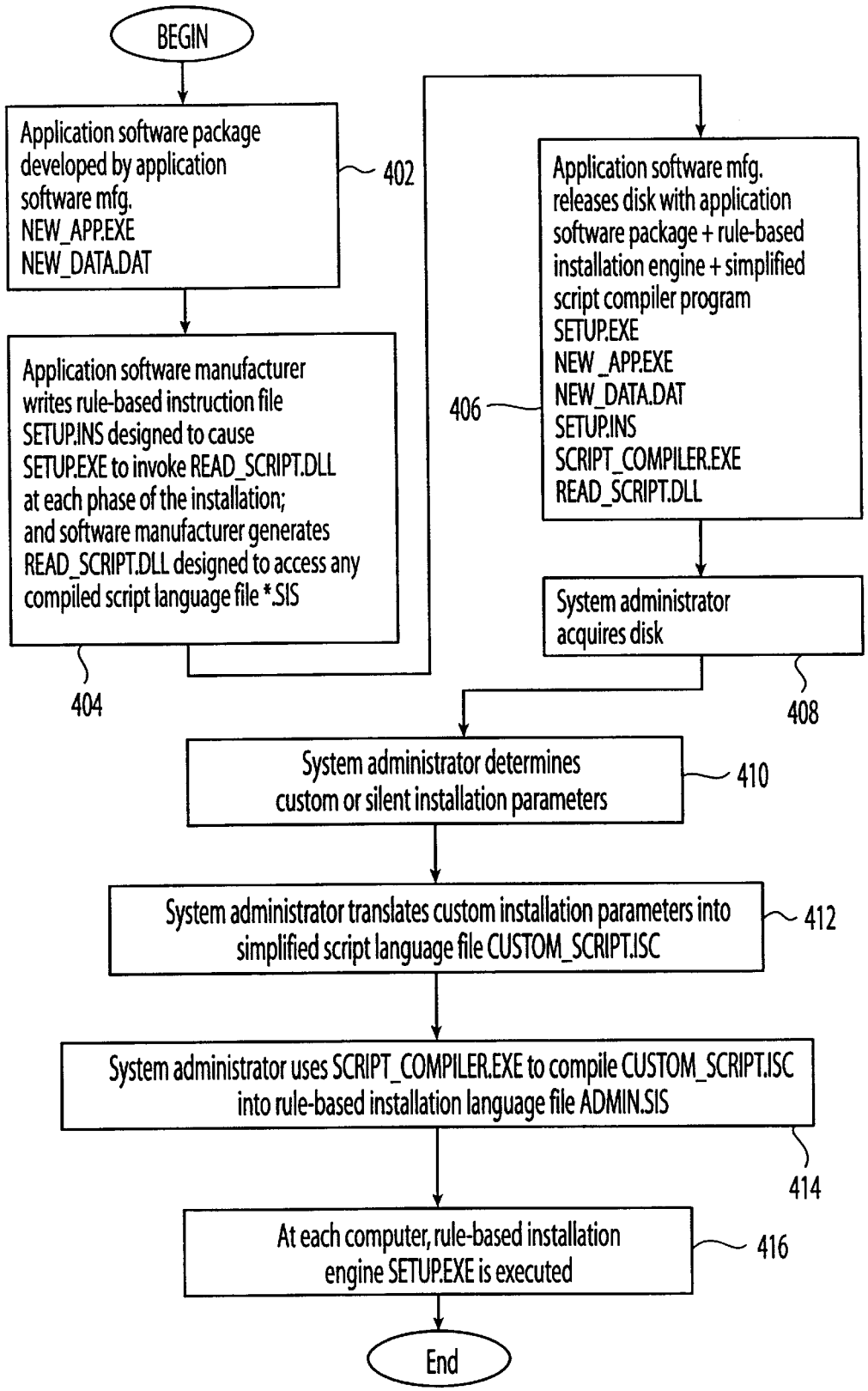
FIG. 4 shows steps taken in the development and installation of an application software package according to a preferred embodiment.

FIG. 4 shows steps taken in the development and installation of an application software package according to a preferred embodiment. The step 402 proceeds in a manner similar to the step 202 of FIG. 2. However, at step 404, the application software manufacturer generates an improved rule-based instruction file SETUP.INS which causes the rule-based installation engine SETUP.EXE to reference a dynamic link library READ_SCRIPT.DLL at each of the predetermined installation phases of the installation process. When routines contained in READ_SCRIPT.DLL are invoked, access is made to any compiled script language file having a designated file extension, for example, *.SIS, and it is determined whether that *.SIS file contains any commands associated with that phase of the installation process.

At step 406, the application software manufacturer releases the script compiler SCRIPT_COMPILER.EXE and the dynamic link library file READ_SCRIPT.DLL along with the application software files, the rule-based installation engine, and the rule-based instruction file. According to a preferred embodiment, the script compiler SCRIPT_COMPILER.EXE is a program adapted and configured to compile a simplified script language file into a compiled script language file for use by the dynamic link library file and rule-based installation engine as outlined above.

At step 408, the system administrator 114 acquires the application software product containing the above files. At step 410, the system administrator determines custom or silent installation parameters, e.g., the desire to copying certain files during a certain predetermined installation phases, or the desire to run a certain application program during the same or different predetermined installation phase. At step 412, the system administrator writes a file CUSTOM_SCRIPT.ISC which contains simplified and intuitive script commands classified according to the predetermined installation phase during which they are to be executed. An exemplary set of such commands and their syntax is described infra.

At step 414, system administrator 114 uses the program SCRIPT_COMPILER.EXE to compile CUSTOM_SCRIPT.ISC into a rule-based instruction file ADMIN.SIS that is readable by the above referenced dynamic link library file during predetermined installation phases of the installation process. As an example, the command string "SCRIPT_COMPILER CUSTOM_SCRIPT.ISC ADMIN.SIS" is launched in a DOS window of Windows 95 or with the File/Run command of the Windows 95 start menu. The output ADMIN.SIS is then distributed to each of the client computers 106a–l along with the other files that were provided at step 406. Finally, at each computer, the rule-based installation engine SETUP.EXE is executed. It is to be appreciated that if the above steps are carried out by an OEM vendor, the filename OEM.SIS may be used instead of ADMIN.SIS.

The commands, syntax, and compiling methodology for a typical simplified installation script language according to a preferred embodiment are now disclosed. In particular, an installation scripting language called ISeamless from Network Associates is generally described. The simplified installation scripting language is a tool network administrators or OEM vendors can use to customize the installation program to fit the needs of their clients. The simplified installation scripting language allows for easier and non-intrusive site-wide deployment of application programs such as VirusScan for Windows 95 v3.0.1 or later.

The following are some examples that are possible with the disclosed simplified installation scripting language. As a first example, an OEM vendor may install a version of the application software package that displays a custom licensing agreement during install, the simplified install script overwriting the shipping license agreement with the custom one. As a second example, the system administrator 114 may deploy a version of an antivirus application program with modified executable or virus signature files, and to modify a Windows 95 registry key so that only program files are scanned instead of all files.

The basic steps used to create, compile, and use a implified script language file *.ISC are as follows. First, an ASCII text editor is opened. For each of the predetermined installation phase portions in which custom action is desired, (a) a SectionName (), followed by open brace "{" is entered, (b) one or more actions desired is entered, and (c) a close brace "}" is entered. When the file is complete, it is saved it with an .ISC extension to the directory containing the script compiler SCRIPT_COMPILER.EXE. Following the above steps, the file is compiled using the syntax "SCRIPT_COMPILER FileName.isc NewName.sis."

For use, the newly compiled *.SIS file is moved or copied to the source directory containing the rule-based installation engine SETUP.EXE and other installation files. Importantly, the filename of the *.SIS file is changed to a default file name or another specialized file name that is recognized by the rule-based instruction file (e.g., ADMIN.SIS or OEM.SIS). Then any additional files needed by the simplified installation script are copied. The rule-based installation engine is then executed.

Basic instructions for writing an Iseamless script file are now described. A simplified installation script language is advantageously adapted to intuitively resemble a known computer language, such as C programming code, although only a small number of C-like commands are required. The following example is a script for deploying a newly received version of an antivirus application such as VirusScan with the latest set of virus signature files available:

EXAMPLE 1

```
PostCopyFile ( )
{
    CopyFile( "%ISSRCDIR%Data.zip", "*.DAT", "", "",
            "%ISSVTARGET%", 0);
}
```

In Example 1 "PostCopyFile ()" is a subject header. The subject header describes a section or phase of the install. The parentheses identify "PostCopyFile" as a function. When the script compiler SCRIPT_COMPILER.EXE reads a Section in the simplified installation script, it will apply the statement that follows in the named installation phase. The next line contains a "{". This opening brace signifies the beginning of the statements that make up the function. The next line begins with the statement and its command and parameters. "CopyFile" is a command. The following open parenthesis is used to separate the command from its parameters. A closed parenthesis must follow at the end of the parameters. If the open parenthesis is not present everything after the open brace will be considered a command, and the script compiler will return a syntax error.

"CopyFile" of Example 1 has six parameters, five of which are STRINGs and one a number. STRING parameters are identified by the fact that they are end-capped by quotes (""). STRINGs are required to have opening and closing quote marks. Commas are used to separate parameters.

As shown in Example 1, simplified script files may contain variables such as "%ISSRCDIR%". "%ISSRCDIR%" is a variable recognized by the script compiler to mean the directory where the installation files are stored. Variable are required to be end capped with a '%' symbol. A number does not need quotation marks when it is interpreted as an integer and not a STRING. A STRING can be a number, and when it is, it is end capped with quotation marks.

According to a preferred embodiment, the script compiler is not case-sensitive. However, so as to clearly describe the preferred embodiments, the present disclosure will present commands and variables with mixed case letters for the benefit of the reader. As is common in most operating systems, the complete identity of a file is required in the simplified scripting language. When it is necessary to PATH something, double backslashes are required. The script compiler will interpret two backslashes between quotation marks as a single backslash. For example, C:\ would be represented in the install script between quotations as C:\\. The script compiler will recognize long file names. There are two ways to comment simplified installation scripts as shown in Example 2.

EXAMPLE 2

```
// This is a comment
/* This is also a comment */
/* And this is a comment
   with a carriage return */
```

Carriage returns and spaces are called white space and do not matter to the script compiler. The script compiler generally looks for a section name, braces, commands, parentheses, parameters, commas, quotations, and semicolons. As long as these are in the correct order, and the type of information the compiler is expecting in each area is correct, arguments can potentially all be placed on the same line without spaces. However, this is not recommended as it makes the simplified installation script more difficult to read and/or debug.

The predetermined installation phases during which custom commands can be executed are now described. In particular, Table 1 shows a set of predetermined installation phases according to a preferred embodiment.

TABLE 1

INSTALLATION PHASES

| Installation Phase | Description |
|---|---|
| PreInitial ( ) | Before the install sets its internal settings |
| PostInitial ( ) | After the install sets its internal settings |
| PreLicense ( ) | Before the licensing agreement appears |
| PostLicense ( ) | After the licensing agreement appears |
| PreGetDest ( ) | Before the install asks for a destination directory |
| PostGetDest ( ) | After the install asks for a destination directory |
| PreCopyFile ( ) | Before the install copies program files |
| PostCopyFile ( ) | After the install copies program files |
| PreProductConfig ( ) | Before the install configures INI & Registry settings |
| PostProductConfig ( ) | After the install configures INI & Registry settings |
| PreCreateIcons ( ) | Before the install creates program icons |
| PostCreateIcons ( ) | After the install creates program icons |
| PreWhatsNew ( ) | Before the install displays the README file |
| PostWhatsNew ( ) | After the install displays the README file |
| PreFinish ( ) | Before the install cleans-up before shutting down. This is the last section executed if the install reboots the computer. |
| PostFinish ( ) | After the install cleans-up before shutting down. This section is not executed if the install reboots the computer. |

In general, according to a preferred embodiment, actions written into the predetermined installation phases as shown in Example 3.

EXAMPLE 3

```
SectionName ( )
{
    Action ( ... parameters ... ) ;
    Action ( ... parameters ... ) ;
    ...
    Action ( ... parameters ... ) ;
}
```

In general, according to a preferred embodiment, the simplified installation script language allows the system administrator to program commands including those shown in Table 2:

TABLE 2

COMMANDS FOR SIMPLIFIED SCRIPT INSTALLATION FILE

| Action | Description |
|---|---|
| CopyFile | Copies a file or set of files from a directory or a zip file to a target directory |
| DeleteFile | Deletes a file or a set of files from a directory |
| RunCustomProgram | Launches a program during the install |
| SetRegValue | Set registry values |
| SetIniValue | Set values in INI files. |
| VariableValue | Set the value of installation internal variables |

The syntax and use of variables in a simplified script installation language according to a preferred embodiment is now described. While the following examples are given for a Windows 95 operating system, one skilled in the art will readily recognize that similar variables are easily identified for other operating systems such as Windows NT, MacIntosh OS, UNIX, LINUX, or Java-based systems. The variables listed below in Table 3 are available to the system administrator for use in the simplified script language file. For example, ISWINSYSDIR specifically looks for and identifies the Window\System directory, wherever it is located. It is required that these variables be end capped with a '%' symbol. Each variable must have its own set of '%' symbols.

TABLE 3

SPECIAL VARIABLES FOR SIMPLIFIED SCRIPT LANGUAGE

| Variable | Description | Sample |
|---|---|---|
| ISWINSYSDISK | Disk containing the Windows system directory | C: |
| ISWINSYSDIR | Windows system directory | C:\WINDOWS\SYSTEM\ |
| ISWINDISK | Disk containing the Windows directory | C: |
| ISWINDIR | Windows directory | C:\WINDOWS\ |
| ISSRCDISK | Disk where the Installation files are stored | D: |
| ISSRCDIR | Directory where the Installation files are stored | D:\INSTALLER\VirusScan30\ |
| ISSUPPORTDIR | Directory where installs puts its temporary files | C:\TEMP\ISTMP11.DIR\ |
| ISSVTARGET | Directory where the product will be installed | C:\Program Files\McAfee\VirusScan\ |
| ISCOMMONFILES | Where Windows Common Files are located | C:\Program Files\Common Files\ |
| ISFOLDER_DESKTOP | Where the Desktop folder is located | C:\WINDOWS\Desktop\ |
| ISFOLDER_STARTMENU | Where the Start Menu folder is located | C:\WINDOWS\Start Menu\ |
| ISFOLDER_STARTUP | Where the Startup folder is located | C:\WINDOWS\Start Menu\Programs\Startup\ |
| ISPROGRAMFILES | Where the Program File folder is located. | C:\Program Files\ |

For clarity of disclosure, a sample problem and a sample simplified script file for solving this problem is disclosed. In this example, it is desired that before the Licensing agreement appears during installation, a custom licensing agreement LICENSE.TXT is copied for the install to display. After the files are copied, the original licensing agreement on the hard drive is overwritten with the custom one. A script file for achieving this result is shown in Example 4.

EXAMPLE 4

```
PreLicense
{
    CopyFile ("", "LICENSE.TXT", "%ISSRCDIR%"
            "", "%ISSUPPORTDIR%"",0);
}
PostCopy
{
    CopyFile ("", "LICENSE.TXT", "%ISSRCDIR%",
            "", "%ISSVTARGET%", 0 );
}
```

An additional sample problem and a sample simplified script file for solving this problem is now disclosed. In this example, it is desired that after the application software files are copied, certain application files DEFAULT.VSC and DEFAULT.VSH on the hard drive are overwritten with a custom set of .VSC/.VSH files. It is also desired that after the product has been configured, then a registry key is modified. Finally, it is also desired that after the application software files are copied, the *.DAT files on the hard drive and with the custom *.DATs. A script file for achieving this result is shown in Example 5.

EXAMPLE 5

```
PreInitial ( )
{
    VariableValue( "NCCONFIGDEBUG", "TRUE" );
}
PostCopyFile ( )
{
    CopyFile ("%ISSRCDIR%Default.zip", "DEFAULT.*", "",
            "", "%ISSVTARGET%",0)
    CopyFile ("%ISSRCDIR%Dats.zip", "*.DAT", "", "",
            "%ISSVTARGET%", 0 );
}
PostProductConfig ( )
```

```
{
SetIniValue ( "%ISSVTARGET%default.vsc",
    "ScanOptions",
    "szMoveToFolder",
    "%ISSVTARGET%Infected",
    0 );
}
```

The definitions and syntax for the commands listed in Table 2 are now described in detail.

The CopyFile command is used to copy files from any source directory into any destination directory. This command has the following syntax:

CopyFile( STRING SourceZipFile, STRING SourceFileName, STRING SourceDirectory, STRING TargetFile, STRING TargetDirectory, NUMBER Recursion);
   SourceZipFile [STRING]: Specify the name of the zip file from which to extract the files. If "" is specified, the CopyFile command will not use any zip files and will take the SourceDirectory as the source location. Please include the directory of the zip file in this parameter.
   SourceFileName [STRING]: If a zip file is used, the following type of file names can be used: Filename.EXT, Long File Name.Extension, *.Extension, Filename.*, or *.* If zip files are not used, any file specification can be used.
   SourceDirectory [STRING]: If a zip file is used, then this will be the source directory contained in the zip file being extracting from.
   TargetFile [STRING]: Reserved for expandability; enter an empty string ("") .
   TargetDirectory [STRING]: Where the script writer wants the files copied/extracted to.
   Recursion [INTEGER]: A '1' or '0' may be entered. Type '1' if recursion is desired; by typing '1', the same copy operation on every subdirectory contained in the source directory specified will be performed. Type '0' if this functionality is not wanted. This will recreate the same sub-tree contained in the SourceDirectory on the TargetDirectory.

The DeleteFile command will delete a file or a set of files. This command has the following syntax:

DeleteFile( STRING SourceFile, STRING SourceDestination, INTEGER ExtraFlag );
   →SourceFile [STRING]: Either an individual filename or a set of files (wildcards).
   SourceDestination [STRING]. The location in which the files are stored.
   ExtraFlag [INTEGER]: Reserved for expandability; enter '0'.

The RunCustomProQram command allows for the running of custom programs while the install is running. This command has the following syntax:

RunCustomProgram( STRING PrograrPathAndFile, STRING Arguments, NUMBER Wait);
   →ProgramPathAndFile [STRING]: This is the path to the program and the programs name.
   Arguments [STRING]: These are the arguments passed to the program. If there are none, put an empty string ("").
   Wait [NUMBER]: A '1' or '0' may be entered. Type '1' if install is to wait for program completion before resuming the install. Type '0' if the install is to launch the program and rue continue the install without waiting.

The SetReqvalue command allows for the modification of Windows 95 registry values. This is a useful feature if it is desired to alter registry settings made by the install. This command has the following syntax:

SetRegValue( STRING EKEY_Source, STRING Key, STRING Name, STRING Type, STRING Value, NUMBER ExtraParam);
   →HKEY_Source [STRING]: This represents the starting point in the tree and should be one of the following: "HKEY LOCAL MACHINE", "HKEY_CLASSES_ROOT", "HKEY_CURRENT_USER" or "HKEY_USERS".
   Key [STRING]: The name of the key.
   Name [STRING]: The name associated with the value.
   Type [STRING]: The registry will accept three value types, STRING, binary, and DWORD. Type "STRING" if the value to be entered in "Value [STRING]" is an alphanumeric entry, or type "NUMBER" if the value to be entered in "Value [STRING] is a DWORD, i.e. 0×00000000 (0). Refer to Microsoft documentation for information about the different type of registry entries.
   Value [STRING]: The value of either the "STRING" or "NUMBER" entry. A STRING may be alphanumeric or may contain only letters, only numbers, or both. If a STRING only contains numbers, it is still required to put quotes ("") around the value. If STRING has been selected, and the STRING happens to be a set of numbers, not end capped by quotes (""), then the compiler will try to interpret the parameter as a real number instead of a string and fail.
   ExtraParam [NUMBER]: Reserved for expandability; enter '0'.

The SetInivalue command is similar to SetRegValue except that it allows for alteration of INI file settings made by the install. This command has the following syntax:

SetIniValue(STRING File, STRING Section, STRING Key, STRING Value, NUMBER ExtraParam );
   → File [STRING]: The INI file containing the entry to be changed. The path to the INI file should be included.
   Section [STRING]: The section in which to modify a value.
   Key [STRING]: The name associated with that value.
   Value [STRING]: The value itself. Even if it is a number, it needs to be in quotes ("") .
   ExtraParam [INTEGER]: Reserved for expandability; enter '0'.

It is to be appreciated that other simplified script installation language commands may be added to the above list of simplified script language commands without departing from the scope of the preferred embodiments. As an example, user interface commands such as EnterDisk, which allows a user to change a disk in a given drive letter, may be incorporated. Additionally, other file management commands such as FileAttribute, which sets file attributes such as read-only, hidden, or archive, may be incorporated. Other commands that add to the capability of the simplified script language while maintaining a simple and intuitive character may be incorporated without departing from the scope of the preferred embodiments.

It is to be further appreciated that the command syntax presented above is only exemplary of the type of syntax that may be used. It has been found that a simplified script language syntax based loosely on a "C" instruction paradigm is intuitive and simple to understand by persons skilled in the art. However, other syntaxes that are intuitive and simple to understand may optionally be used without departing from the scope of the preferred embodiments.

Importantly, an OEM application software manufacturer may execute the steps outlined previously for the system administrator. This is especially apparent in situations where the OEM provider is providing products customized for certain large customers or groups of customers.

It has been found that during a typical silent install associated with the InstallShield® program, the installation is often considered "too silent" for the user. It has been found that the optional display of a minimal progress indicator or Silent Notification Icon is desirable, so that users may have some indicator of the events taking place in the background.

While preferred embodiments have been described, these descriptions are merely illustrative and are not intended to limit the scope of the present invention. As an example, within the scope of the preferred embodiments is a method for adaptive installation of application software onto client computers, wherein installation script commands for actively querying the hardware and software of the client computer are written and compiled into the rule-based instruction file. Depending upon the answers received, varying application software files may be copied onto the client computer. The implementation of this optional querying and adaptive installation capability may be achieved by incorporating simplified if-then-else instructions into the simplified installation script language.

As an additional optional capability, installation script commands for actively detecting user sophistication may be written and compiled into the rule-based instruction file. Depending upon the detected level of user sophistication, different introductory or tutorial programs may be loaded onto the client computer according to the ability of the user.

Thus, while preferred embodiments have been described, these descriptions are merely illustrative, and the scope of the present invention is limited only by the appended claims.

What is claimed is:

1. A method for installing an application software package onto a computer using a rule-based installation engine, the rule-based installation engine operating according to a rule-based instruction file, comprising the steps of:
   determining at least one custom installation parameter associated with the application software package;
   translating said at least one custom installation parameter into a simplified script language file; and
   executing the rule-based installation engine for installing the application software package;
   wherein said rule-based instruction file is adapted and configured to cause the rule-based installation engine to execute instructions contained in said simplified script language file;
   whereby customized and flexible installation of the application software package is achieved without specific knowledge of the language of the rule-based instruction file.

2. The method of claim 1, further comprising the step of compiling said simplified script language file into a compiled script language file, wherein said rule-based instruction file is adapted and configured to cause the rule-based installation engine to execute instructions contained in said compiled script language file.

3. The method of claim 2, said step of compiling comprising the steps of:
   identifying a file name of said simplified script language file;
   identifying a desired output file name;
   executing a script compiler for compiling said simplified script language file into said compiled script language file, said compiled script language file having said desired output file name.

4. The method of claim 3, wherein said rule-based instruction file is created by compiling a rule-based installation language file using a compiler provided by a provider of the rule-based installation engine.

5. The method of claim 1, said simplified script language file comprising a predetermined sequence of installation phase portions corresponding to a predetermined set of installation events, said step of translating comprising the steps of:
   determining an installation phase associated with said at least one custom installation parameter; and
   expressing said at least one custom installation parameter as a simplified script language command in the corresponding installation phase portion of said simplified script language file.

6. The method of claim 5, wherein said at least one custom parameter comprises an identifier of an executable program stored on said computer, whereby said executable program is initiated during said corresponding installation phase portion during the installation of said application software package.

7. The method of claim 6, wherein said application software package is an antivirus application package comprising a virus scanning engine and at least one virus signature file, and wherein said simplified installation script file comprises a command to install updated virus signature files which are newer than said at least one virus signature file.

8. The method of claim 7, wherein said simplified installation script file comprises a command to display a modified license agreement different than a license agreement indicated by said rule-based instruction file.

9. A method for providing an application software package and an easily configurable installation package for use in installing the application software package onto a computer, comprising the steps of:
   developing the application software package;
   identifying a standard rule-based installation engine for use during an installation process, said rule-based installation engine operating according to rule-based instruction files;
   developing a simplified installation script language comprising commands based on a predetermined sequence of installation phases;
   developing a rule-based instruction file that causes said rule-based installation engine to execute commands according to a simplified script language file during the installation process, said simplified installation script language file to be created according to custom installation parameters by a system administrator; and
   providing the application software package, said installation script language, said rule-based instruction file, and the rule-based installation engine for allowing customized installation of said application software package onto the computer.

10. The method of claim 9, said step of developing a rule-based instruction file comprises the steps of:
    writing a rule-based installation language file according to a specification provided by a provider of said rule-based installation engine; and compiling said rule-based installation language file into a rule-based instruction file using a compiler provided by the provider of said rule-based installation engine.

11. The method of claim 10, further comprising the step of developing a script compiler for compiling said simplified script language file into a compiled script language file, wherein said rule-based instruction file is adapted and configured to cause the rule-based installation engine to execute instructions contained in said compiled script language file.

12. The method of claim 9, wherein said predetermined sequence of installation phases comprises a sequence of time intervals lying between a predetermined sequence of discrete installation events.

13. A computer-readable medium which can be used for directing an apparatus to convert a simplified script language file into a compiled script language file, the compiled script language file comprising instructions for execution by a standard rule-based installation engine during an installation of an application software package onto a computer, comprising:

means for directing said apparatus to read said simplified script language file, said simplified script language file containing at least one custom installation parameter;

means for directing said apparatus to convert said at least one custom installation parameter into the compiled script language file; and means for directing said apparatus to write the compiled script language file onto a computer-readable apparatus;

wherein said standard rule-based installation engine operates according to commands stored in said compiled script language file, thereby allowing flexible and customized installation of the application software package without specific knowledge of a language used by said standard rule-based installation engine.

14. The computer-readable medium of claim 13, wherein said simplified script language file comprises commands that are executed according to a predetermined sequence of installation phases.

* * * * *